United States Patent
Humlicek et al.

(10) Patent No.: US 6,859,890 B2
(45) Date of Patent: Feb. 22, 2005

(54) METHOD FOR REDUCING DATA/PARITY INCONSISTENCIES DUE TO A STORAGE CONTROLLER FAILURE

(75) Inventors: Donald R. Humlicek, Wichita, KS (US); Charles E. Nichols, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 498 days.

(21) Appl. No.: 10/135,266

(22) Filed: Apr. 30, 2002

(65) Prior Publication Data

US 2003/0204774 A1 Oct. 30, 2003

(51) Int. Cl.⁷ .............................................. G06F 11/00
(52) U.S. Cl. ............................ 714/9; 714/6; 714/10; 714/11
(58) Field of Search ........................... 714/6, 9, 10, 11

(56) References Cited

U.S. PATENT DOCUMENTS

| | | | | |
|---|---|---|---|---|
| 5,488,701 A | * | 1/1996 | Brady et al. | 714/6 |
| 5,504,858 A | * | 4/1996 | Ellis et al. | 714/6 |
| 5,533,190 A | * | 7/1996 | Binford et al. | 714/6 |
| 5,675,726 A | * | 10/1997 | Hohenstein et al. | 714/6 |
| 5,720,028 A | * | 2/1998 | Matsumoto et al. | 714/9 |
| 5,933,592 A | * | 8/1999 | Lubbers et al. | 714/6 |
| 5,996,046 A | * | 11/1999 | Yagisawa et al. | 711/114 |
| 6,725,392 B1 | * | 4/2004 | Frey et al. | 714/6 |

* cited by examiner

*Primary Examiner*—Robert Beausoliel
*Assistant Examiner*—Michael Maskulinski
(74) *Attorney, Agent, or Firm*—Suiter West

(57) ABSTRACT

A method for reducing data/parity inconsistencies due to a storage controller failure in computer storage systems with dual, independent storage controllers and a number of logical volumes comprising one or more physical disk drive devices includes recognizing a failure of the storage controller; assuming access control of the volume; and thereafter, performing at least one write to the volume, wherein, for a predetermined number of writes (N) to the volume after failure of the storage controller, new parity is calculated for the write using new data and other data (Method 2). The predetermined number of writes (N) is at least equal to or greater than the queue depth of the failed storage controller (i.e., the number of I/O operations that the failed storage controller may service at a given time. The method may be implemented by each storage controller of the computer storage system.

25 Claims, 7 Drawing Sheets

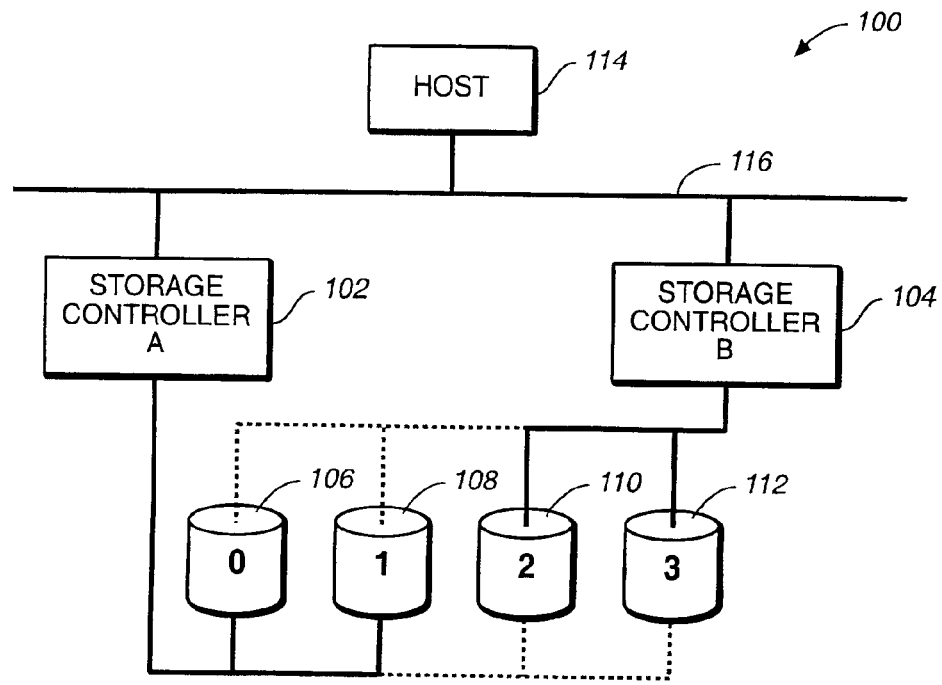
FIG._1
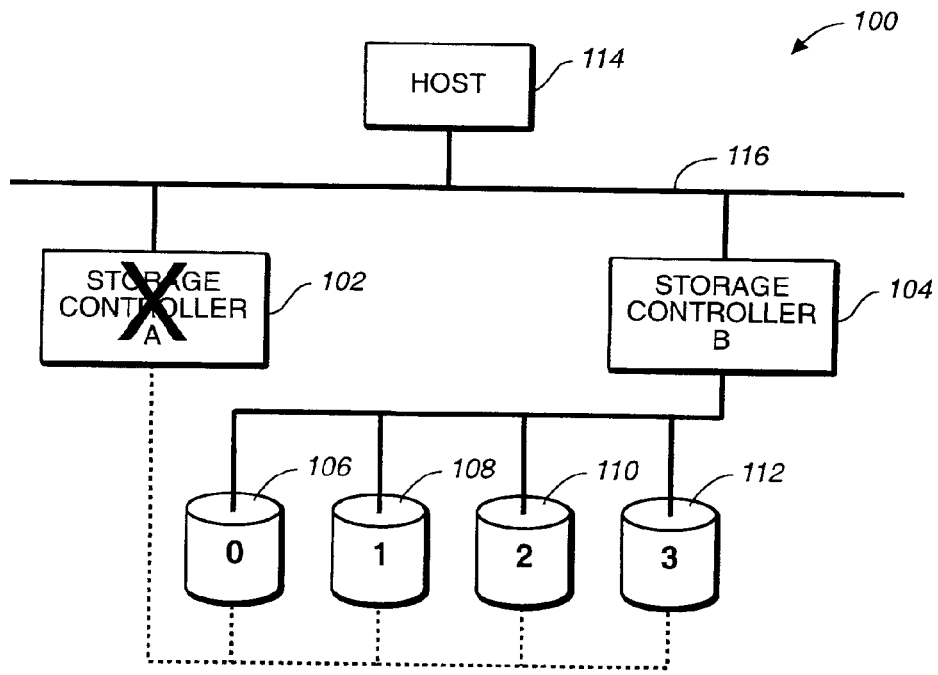
FIG._2

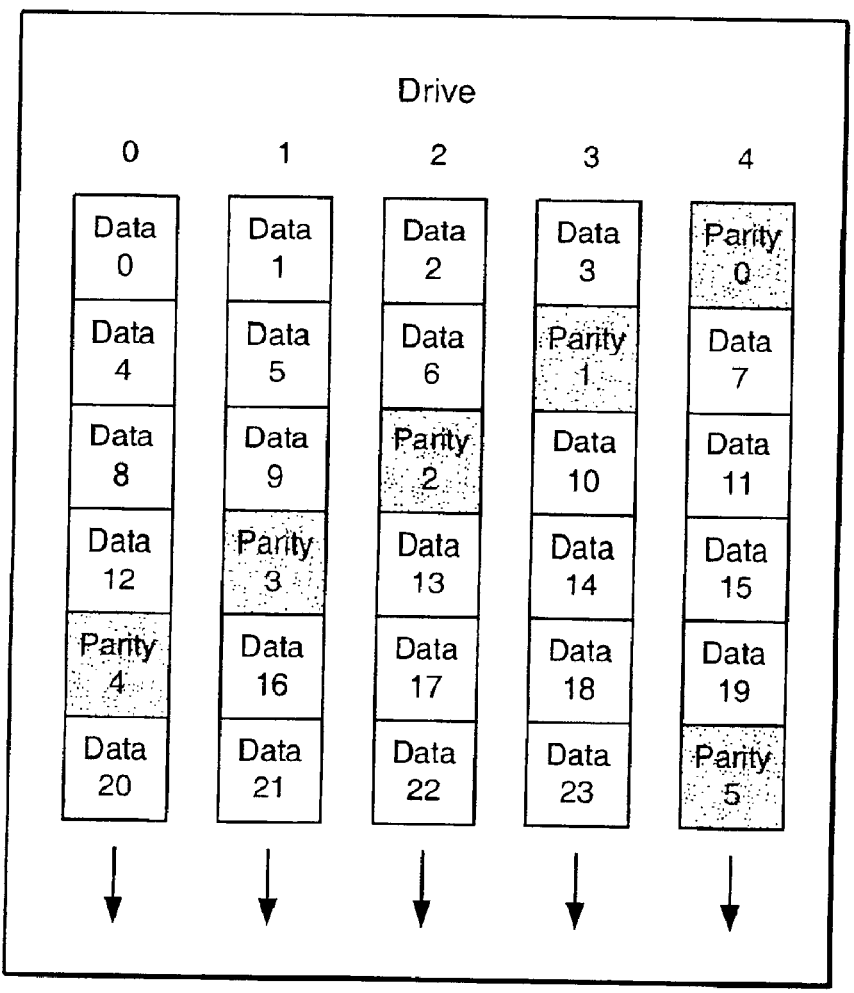
FIG._3
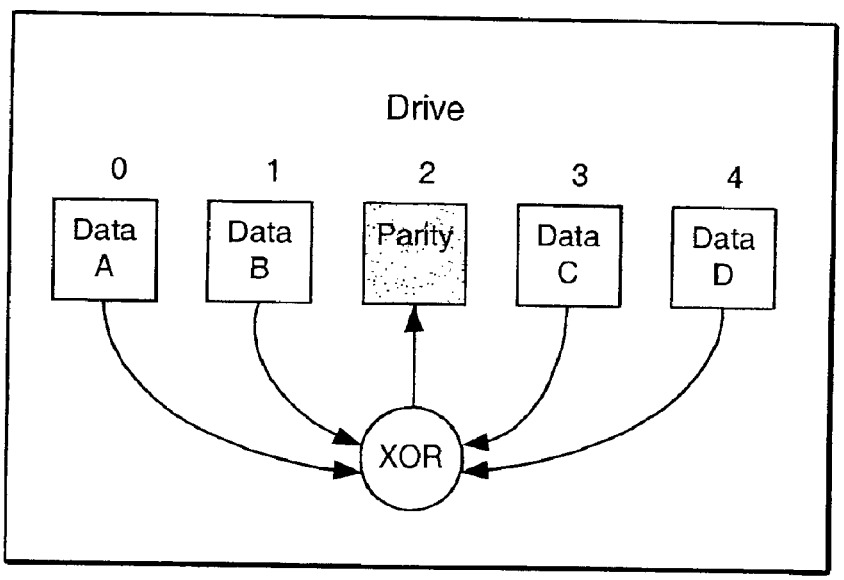
FIG._4

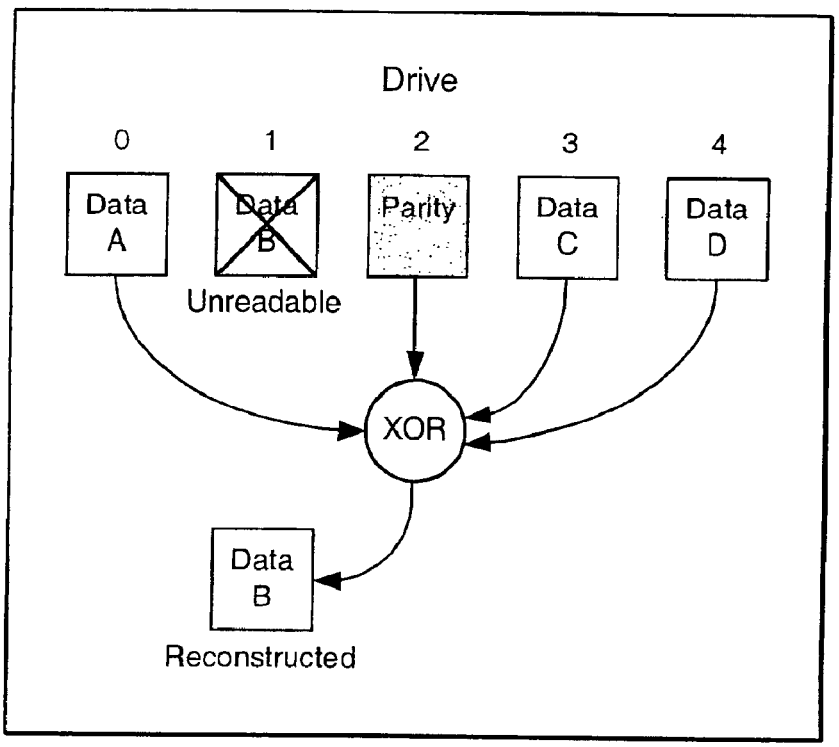
FIG._5
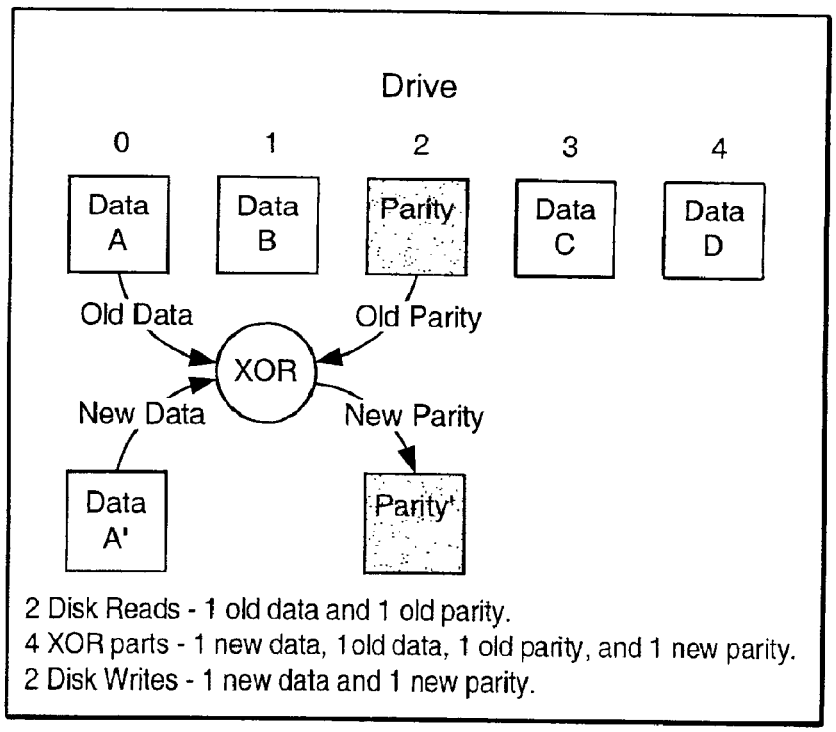
FIG._6

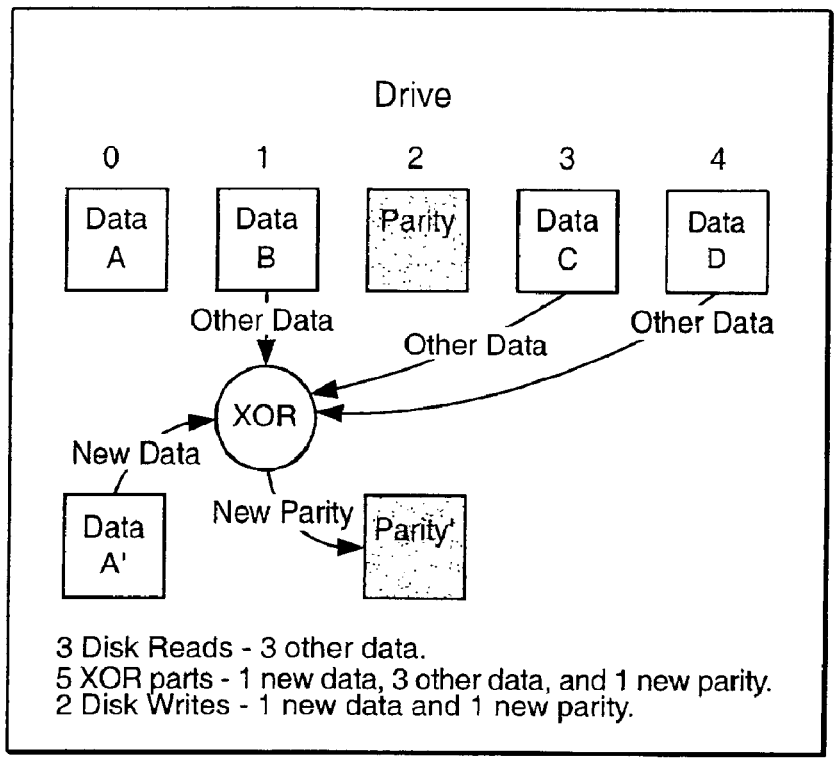
FIG._7
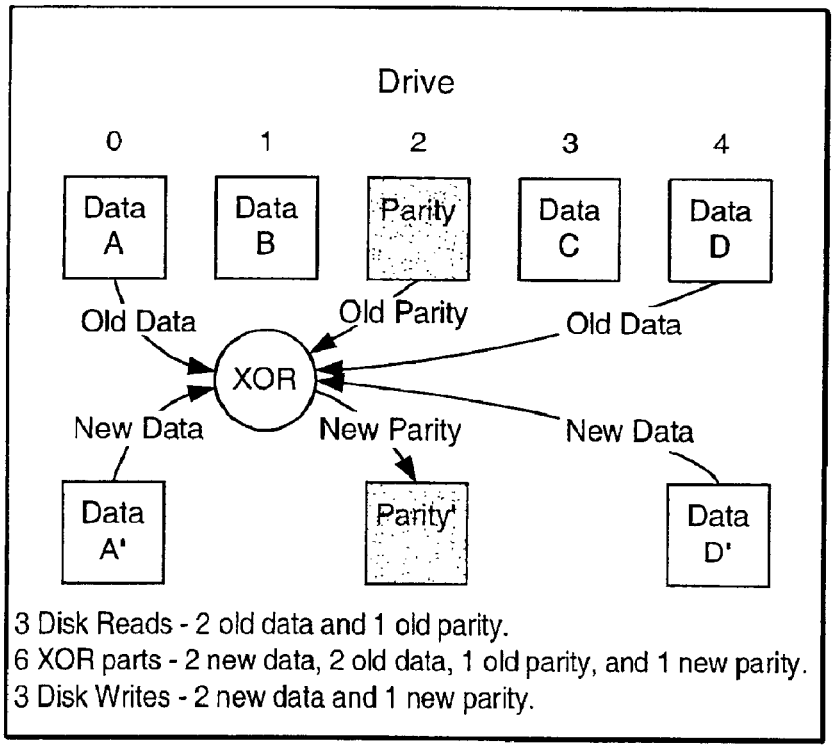
FIG._8

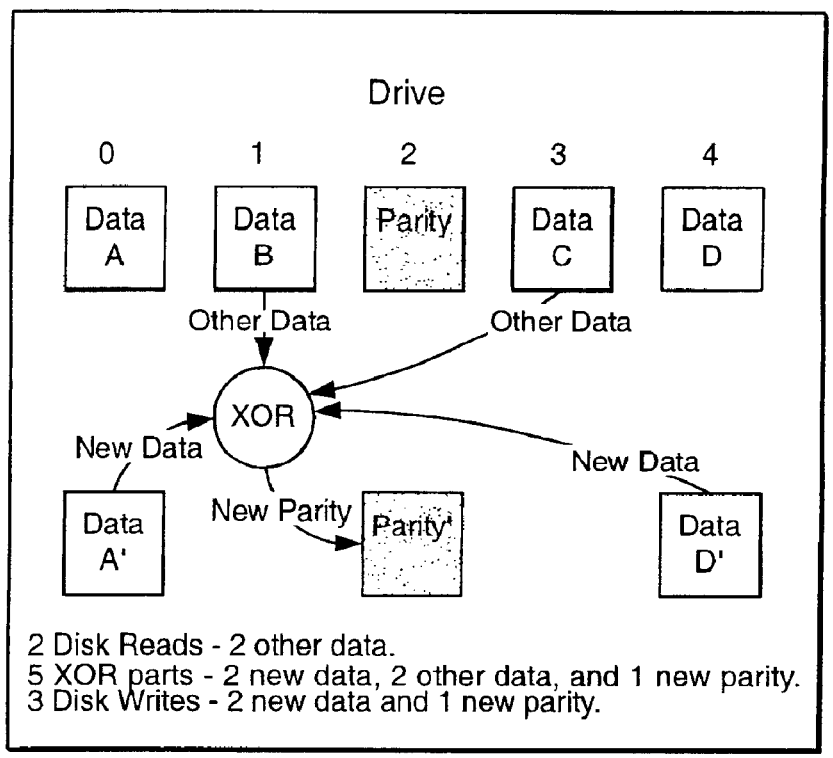
FIG._9
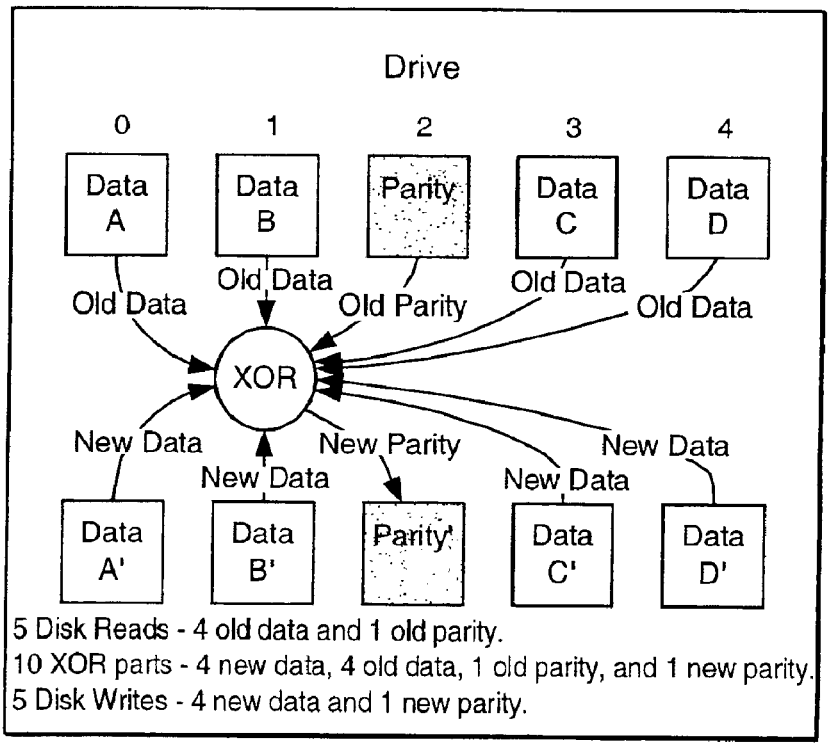
FIG._10

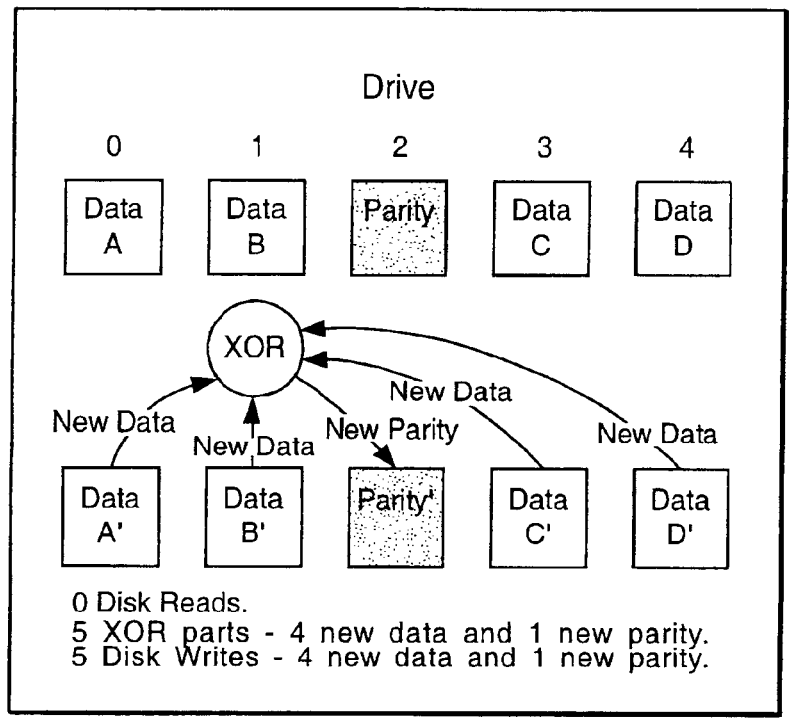
FIG._11
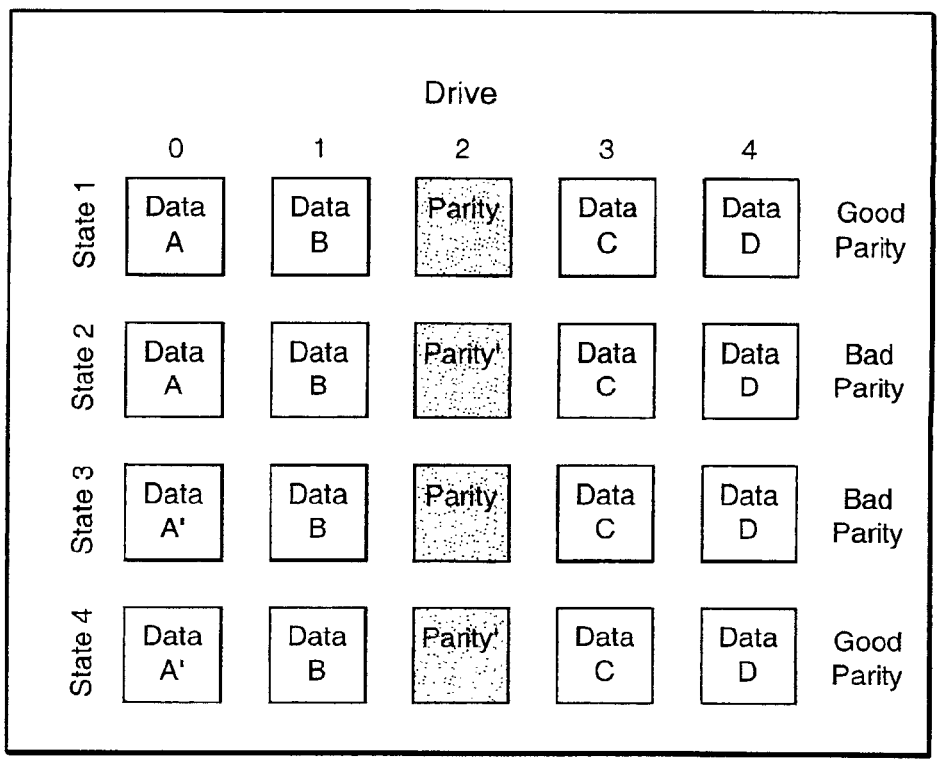
FIG._12

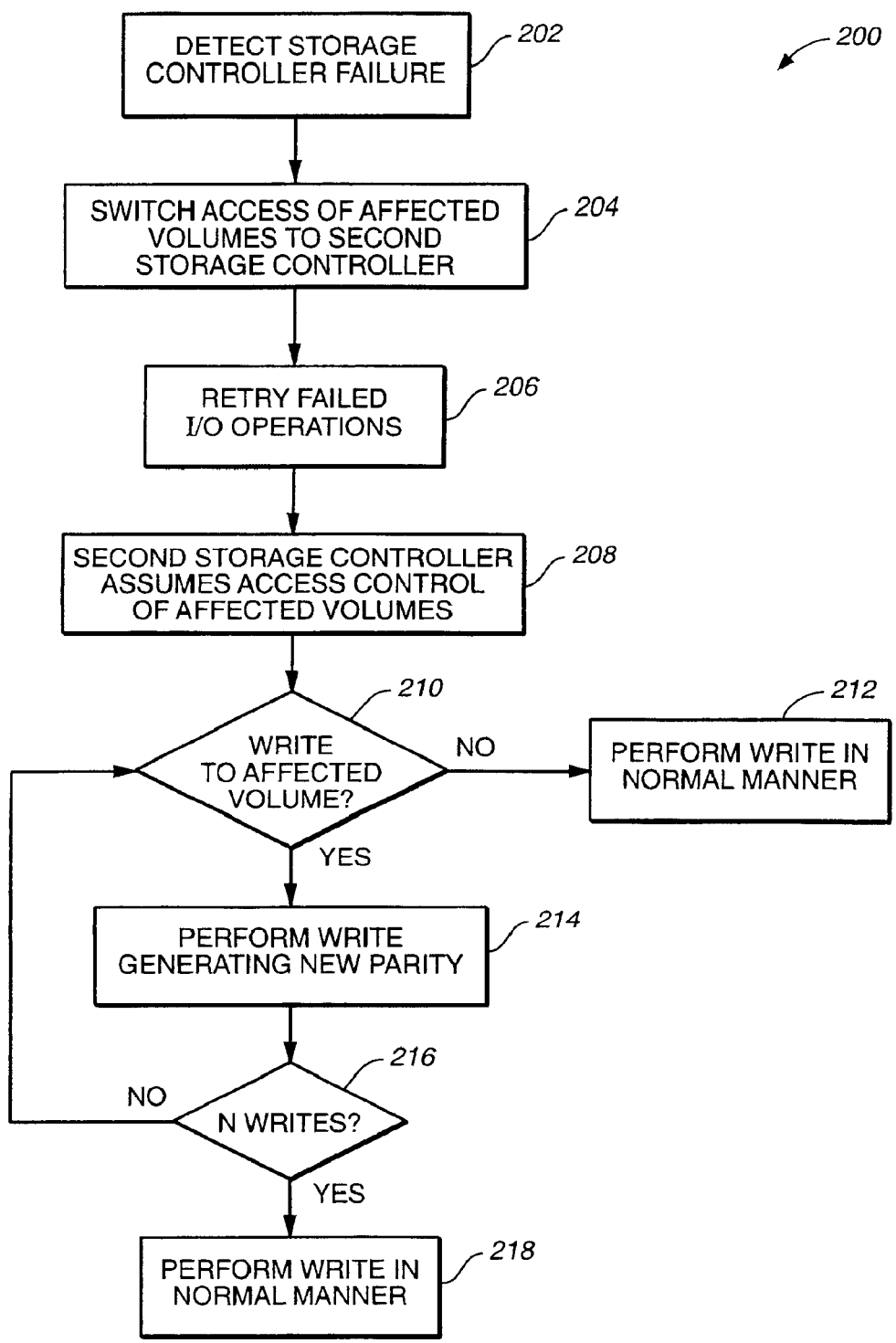
FIG._13

METHOD FOR REDUCING DATA/PARITY INCONSISTENCIES DUE TO A STORAGE CONTROLLER FAILURE

FIELD OF THE INVENTION

The present invention generally relates to the field of computer storage systems with dual, independent Redundant Array of Independent Disk (RAID) storage controllers and a number of disk drives, and particularly to a method for reducing data/parity inconsistencies due to a storage controller failure in such systems.

BACKGROUND OF THE INVENTION

In typical RAID computer storage systems, the storage controllers of the storage system present to the host system a set of logical volumes comprised of one or more of the physical disk devices. The storage system provides full data path access to the storage by employing redundant storage controllers. In the event of a single storage controller failure, the redundant controller will take over access control to the volumes that had been under the control of the now failed controller.

Presently, two methods are used to update parity during a write operation. One method creates new parity from the old parity, old data, and new data. The second method creates new parity from new data and other data. For performance reasons, the method employed for any single write operation depends upon the number of data drives that must updated with new data. The first method, creating new parity from the old parity, old data, and new data, is faster than the second method, creating new parity from new data and other data, if there are relatively few data drives that must be updated.

Because the first method creates new parity using old parity, parity will be valid after the take-over operation only if it was valid prior to the operation. However, new parity will be invalid if old parity was invalid prior to the take-over operation. The second method does not share this problem since it does not use old parity when calculating new parity.

It is desirable to reduce the opportunity for data/parity mismatches on parity protected RAID devices following a storage controller failure. Under certain storage volume configurations, there is no redundant information stored between the storage controllers that can be used to identify disk writes that may have been interrupted due to a controller failure. These interrupted disk writes, if not properly handled, lead to data/parity inconsistencies within the parity stripe to which the writes were directed. Because the interrupted writes are re-tried by the host, the volume data will still be accurate. However, if at some point data in the affected parity stripe is required to be reconstructed from the inaccurate parity, the reconstructed data will be incorrect.

This data/parity inconsistency due to interrupted writes is a well-documented, inherent attribute of RAID 3 and RAID 5 devices. In short, new parity that has been generated based on invalid parity will still be invalid. In the past this problem has been solved using two common approaches.

In the first approach, following a controller failure, the surviving controller is used to scan affected volumes to determine if there are any data/parity inconsistencies. If any inconsistencies are detected, they may then be corrected. In the second approach, redundant information is shared between the storage controllers such that, after failure of a controller, the surviving controller can immediately and accurately recover the interrupted writes. Both approaches have been found to be lacking.

Using the first approach, the volume scan should ideally be completed before other I/O's are allowed to the effected volumes. However, scanning the entire volume for data/parity inconsistencies may be extremely time consuming. Thus, preventing new I/O's until after the scan would be undesirable. However, allowing I/O's prior to completion of the scan creates an opportunity for drive errors to occur that would require data to be reconstructed from inaccurate parity for parity stripes that have not yet been scanned and repaired.

The second approach requires the use of either a shared inter-controller repository or direct inter-controller communication to allow both controllers access to the necessary data to recover from interrupted writes. Either facility introduces latency associated with every write into the main I/O path, resulting in undesirable I/O performance.

SUMMARY OF THE INVENTION

Accordingly, the present invention is directed to a method for reducing data/parity inconsistencies due to a storage controller failure in computer storage systems with dual, independent storage controllers and a number of logical volumes comprising one or more physical disk drive devices. In an exemplary embodiment, the method includes recognizing a failure of the storage controller; assuming access control of the volume; and thereafter, performing at least one write to the volume, wherein, for a predetermined number of writes (N) to the volume after failure of the storage controller, new parity is calculated for the write using new data and other data (method 2). Preferably, the predetermined number of writes (N) is at least equal to or greater than the queue depth of the failed storage controller (i.e., the number of I/O operations that the failed storage controller may service at a given time. In exemplary embodiments, the method may be implemented by each storage controller of the computer storage system.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a block diagram illustrating a computer storage system having dual, independent RAID storage controllers and a number of disk drives in accordance with an exemplary embodiment of the present invention;

FIG. 2 is a block diagram depicting the computer storage system shown in FIG. 1 following failure of a RAID storage controller;

FIG. 3 is block diagram illustrating RAID 5 data and parity;

FIG. 4 is a block diagram illustrating the creation of parity;

FIG. 5 is a block diagram illustrating the reconstruction of data for an unreadable block of a drive;

FIG. 6 is a block diagram illustrating a write to one drive wherein new parity is generated from old parity, old data, and new data (Method 1);

FIG. 7 is a block diagram illustrating a write to one drive wherein new parity is generated from new data and other data (Method 2);

FIG. 8 is a block diagram illustrating a write to two drives wherein new parity is generated from old parity, old data, and new data (Method 1);

FIG. 9 is a block diagram illustrating a write to two drives wherein new parity is generated from new data and other data (Method 2);

FIG. 10 is a block diagram illustrating a write to all drives wherein new parity is generated from old parity, old data, and new data (Method 1);

FIG. 11 is a block diagram illustrating a write to all drives wherein new parity is generated from new data and other data (Method 2);

FIG. 12 is a block diagram illustrating possible states after an interruption in a write due to failure of a storage controller; and FIG. 13 is a flow diagram illustrating a method for reducing data/parity inconsistencies due to a storage controller failure in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

FIGS. 1 and 2 illustrate a computer storage system in accordance with an exemplary embodiment of the present invention. Computer storage system 100 includes dual, independent RAID storage controllers ("Storage Controller A" 102 and "Storage Controller B" 104) each providing access control for a number of logical volumes 106, 108, 110 & 112 comprising one or more physical disk drives. Computer storage system is accessed by a host computer system ("Host" 114) via network 116 for storage and retrieval of information. Preferably, each storage controller 102 & 104 provides access control for one or more of volumes 106, 108, 110 & 112. For example, in the embodiment shown, wherein computer storage system 100 includes four logical volumes 106, 108, 110 & 112, a first of the storage controllers ("Storage Controller A" 102) may provide access control for logical volumes "0" 106 and "1" 108, while a second storage controller ("Storage Controller B" 104) provides access control for logical volumes "2" 110 and "3" 112.

In exemplary embodiments, storage controllers 102 & 104 provide redundancy to computer storage system 100, allowing computer storage system to provide full data path access to volumes 106, 108, 110 & 112 by employing redundant storage controllers. Thus, in the event of a single storage controller failure, the redundant storage controller may take over access to the volumes that were originally under the control of the failed controller. For example, as illustrated in FIG. 2, in the event a first storage controller ("Storage Controller A" 102) fails, for example, due to a hardware failure, or a software failure that renders the storage controller unusable, the second storage controller ("Storage Controller B" 104") may assume access control of the logical volumes (volumes "0" 106 and "1" 108) for which access control was provided by the failed storage controller 102 prior to failure. The second storage controller continues to provide access control to volumes for which it provided access control prior to the storage controller failure (i.e., volumes "2" 110 and "3" 112).

Both data and parity are stored to the disk drives of computer storage system 100, where parity is used to provide recoverability in the event of an unreadable data block due to a drive failure or media error. Referring now to FIGS. 3 through 12, methods for generating new parity during a write operation are discussed. In the discussion of FIGS. 3 through 12, RAID 5 is used as an example. However, it will be appreciated by those of skill in the art that the concepts described may also apply to other RAID levels. As shown in FIG. 3, RAID 5 stripes data and parity across a group of N drives. Within each stripe are N−1 blocks of data and 1 block of parity. Each "block" is comprised of one or more drive sectors. The parity is interleaved across all drives. Parity is computed by exclusive ORing (XOR) each data block within the stripe. FIG. 4 illustrates how parity is calculated. Thus, in FIG. 3, Parity 0 is the XOR of Data 0, 1, 2, and 3. Parity 1 is the XOR of Data 4, 5, 6, and 7, and the like. If any one drive is failed or any one data block is unreadable, the data can be reconstructed by XORing together the other data blocks in the same stripe with its corresponding parity. FIG. 5, depicts a stripe with one unreadable data block due to a failed drive or an unrecoverable read error reported by the drive. As shown in FIG. 5, "Data B" may be reconstructed by XORing "Data A", "Data C", "Data D", and "Parity".

When writing data, it is desirable that new parity be generated and also written. Two methods exist for generating parity. The first method (hereinafter "Method 1") is illustrated in FIGS. 6, 8 and 10. Method 1 creates new parity from new data, old data, and old parity. The second method (hereinafter "Method 2") is illustrated in FIGS. 7, 9 and 11. Method 2 creates new parity from new data and other data. Either method may be used by the computer storage system depending on system design preferences. However, the method typically selected is the one that provides the best performance based on the number of disk reads, disk writes, and XOR components. As shown in FIG. 11, writing to all drives using Method 2 requires no reads.

In a RAID storage controller, interruption of a write operation due to a power cycle, a controller reset, or the like, requires that the controller code be reloaded and restarted. After a write, as shown in FIG. 6, several possible combinations of written data or states exist. FIG. 12 illustrates these states. Where two drives are being written (Drive 0 ("Data A") and Drive 2 ("Parity")), four possible states exist. Of these four possible states, only two states leave the stripe with valid parity, i.e., "State 1" where no drives were written, and "State 4" where all drives where written (assuming that new data was different from old data). Where more drives are being written, the number of possible states is $2^{\#drives}$. However, in such embodiments, only two states leave valid parity. Since the host rewrites the data after an interruption, Method 2 is used to force new parity to be generated.

The present invention reduces the likelihood of data/parity mismatches due to a storage controller failure by guaranteeing that the first N writes on the surviving controller to volumes affected by the failure will be performed in such a manner that valid parity will always be generated. Assuming that a given storage controller can only service a predetermined number (N) of input/output (I/O) operations at a given time (where N is the queue depth of the storage controller), there can be no more than N in-progress writes that would be exposed to interruption due to a storage controller failure and therefore N retries to the surviving controller. In accordance with the present invention, each volume affected by a storage controller failure performs the first N write operations following the storage controller failure using Method 2 described in the discussion of FIGS. 3 through 12, thereby generating new and valid parity.

Turning again to FIGS. 1 and 2, implementation of the present invention in an exemplary computer storage system is described. As described above, storage controller A 102 is configured to provide access control to logical volumes "0" 106 and "1" 108, while storage controller B 104 is configured to provide access control to logical volumes "2" 110 and "3" 112. Storage controllers "A" and "B" each have a total queue depth of "N". Preferably, during normal operation (i.e., during operation where no failure condition exists) as shown in FIG. 1, host 114 reads and writes are performed to all volumes 106, 108, 110 & 112 through their respective storage controllers 102 & 104.

As shown in FIG. 2, storage controller A 102 fails, for example, due to a hardware failure or a software failure that renders the storage controller unusable. Host 114, being unable to access storage controller A 102 due to the failure, switches access of volumes "0" 106 and "1" 108 to storage controller B 104 and retries all I/O operations that failed due to failure of storage controller A 102. Storage controller B 104 assumes access control of volumes "0" 106 and "1" 108 in addition to volumes "2" 110 and "3" 112, for which storage controller B 104 already provides access control.

For each of the volumes directly affected by the failure of storage controller A 102 (i.e., volumes "0" 106 and "1" 108 in the present embodiment), storage controller B 104 performs the first N writes to the volume using Method 2 described in the discussion of FIGS. 3 through 12, generating new, valid parity. For volumes not directly affected by the failure (i.e., volumes "2" 110 and "3" 112 in the present embodiment), writes are processed in a normal manner using either Method 1 or Method 2. For each volume affected by the failure of storage controller A 102 (i.e., volumes "0" 106 and "1" 108 in the present embodiment), once N writes have been performed following failure of storage controller A 102, subsequent writes may be processed in a normal manner using either Method 1 or Method 2.

Because the number of writes that were in-progress to a given volume at the time of failure of the failed storage controller (e.g., storage controller A 102), the present invention takes a worst-case approach and assumes that any given volume may have had N writes interrupted. Thus, all affected volumes are made to perform the first N writes following a storage controller failure using Method 2. Because Method 2 generally requires more time to calculate parity, using Method 2 may have an impact on write performance. However, this impact is minimized by the present invention since Method 2 need only be used for a relatively small number (N) of I/O operations. The present invention also eliminates the need for a lengthy parity scan, and the associated opportunity for drive errors following a controller failure common in previous approaches. Additionally, there is no impact to performance associated with sharing of interrupted write data between storage controllers, since the only performance impact is to the relatively few writes to affected volumes following the storage controller failure.

Referring now to FIG. 13, a method for reducing data/parity inconsistencies due to a storage controller failure in accordance with an exemplary embodiment of the present invention is described. Method 200 is initiated upon detection of failure of a storage controller within a computer storage system such as computer storage system 100 shown in FIGS. 1 and 2, at step 202. Failure of the storage controller may be due to a hardware failure or a software failure that renders the storage controller unusable. Access of volumes affected by the failure of the storage controller is switched to a second storage controller at step 204. For example, a host computer coupled to the computer storage system, being unable to access failed storage controller, may switch access of the volumes for which that storage controller provides access control to a second storage controller. All I/O operations that failed due to failure of the storage controller are then retried at step 206. The second storage controller assumes access control of the affected volumes in addition to the unaffected volumes for which the second storage controller already provides access control at step 208.

A determination is next made at step 210 whether the write is to a volume affected by the failure of the first storage controller. If the write is to an unaffected volume, the write is processed in a normal manner using either Method 1 or Method 2 at step 212. However, if a determination is made that the write is to an affected volume, at step 210, the write is processed generating new parity using Method 2 at step 214. A second determination is then made whether N writes have been made to the volume at step 216. If N writes have not been made to the affected volume, steps 210 through 216 are repeated for the next write to that volume. In this manner, for each of the volumes directly affected by the failure of the storage controller, the second storage controller performs the first N writes to the volume using Method 2 described in the discussion of FIGS. 3 through 12, generating new, valid parity. However, for volumes not directly affected by the failure, writes are processed in a normal manner. If, at step 216, a determination is made that N writes have been performed to the affected volume, subsequent writes are performed in a normal manner using either Method 1 or Method 2 at step 218. In this manner, once N writes have been performed for the affected volume following failure of the storage controller, subsequent writes may be processed in a normal manner using either Method 1 or Method 2.

It will be appreciated that the computer storage system 100 (FIGS. 1 and 2) described herein is exemplary in nature and provided for illustration of the present invention. Thus, the description of computer storage system 100 and methods for generating parity (FIGS. 3 through 12) is not meant to limit the invention to implementation in computer storage systems having any particular configuration with respect to the number of participating storage controllers, the queue depths of the storage controllers, the number of volumes supported by the computer storage system, the RAID levels employed, or the like.

In exemplary embodiments, the methods disclosed may be implemented as sets of instructions or software readable by each storage controller, host, or other device within the computer storage system. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for reducing data parity inconsistencies due to failure of a storage controller providing access control for a volume within a computer storage system, the method comprising:

recognizing a failure of the storage controller;
   assuming access control of the volume; and
   thereafter, performing at least one write to the volume,
      wherein, for a predetermined number of writes to the volume after failure of the storage controller, new parity is calculated for the write using other data.

2. The method as claimed in claim 1, wherein the predetermined number of writes is at least equal to or greater than the queue depth of the storage controller.

3. The method as claimed in claim 1, further comprising, upon performing the predetermined number of writes to the volume after failure of the storage controller, performing an additional write to the volume, wherein new parity is determined via one of calculating new parity using old data and old parity and calculating new parity using other data.

4. The method as claimed in claim 1, wherein the computer storage system further includes a second storage controller providing access control for a second volume, the second storage controller being capable of assuming access control of the first volume upon recognizing the failure of the first storage controller.

5. The method as claimed in claim 4, further comprising performing at least one write to the second volume after failure of the storage controller, wherein new parity is determined via one of calculating new parity using old data and old parity and calculating new parity using other data.

6. The method as claimed in claim 1, wherein performing at least one write to the volume comprises retrying a write that failed due to failure of the storage controller.

7. A computer storage system, comprising:

a plurality of volumes for storing information;
   a first storage controller for providing access control for a first volume of the plurality of volumes; and
   a second storage controller for providing access control for a second volume of the plurality of volumes, the second storage controller being capable of assuming access control for the first volume of upon recognizing a failure of the first storage controller,
   wherein, for a predetermined number of writes to the first volume after failure of the first storage controller, new parity is calculated for the write using other data.

8. The computer storage system as claimed in claim 7, wherein the predetermined number of writes is at least equal to or greater than the queue depth of the first storage controller.

9. The computer storage system as claimed in claim 7, wherein, upon performing the predetermined number of writes to the volume after failure of the first storage controller, the second storage controller is capable of performing an additional write to the first volume, new parity for the additional write being determined via one of calculating new parity using old data and old parity and calculating new parity using other data.

10. The method as claimed in claim 7, wherein the second storage controller is further capable of performing at least one write to the second volume after failure of the first storage controller, new parity being determined for the write via one of calculating new parity using old data and old parity and calculating new parity using other data.

11. The computer storage system as claimed in claim 7, wherein performing at least one write to the first volume comprises retrying a write that failed due to failure of the first storage controller.

12. The computer storage system as claimed in claim 7, further comprising a host, the host being capable of switching access control of the first volume from the first storage controller to the second storage controller upon being unable to access the first storage controller.

13. The computer storage system as claimed in claim 12, wherein the host retries at least one write to the first volume comprises retrying a write that failed due to failure of the first storage controller.

14. A computer storage system capable of reducing data parity inconsistencies due to failure of a storage controller providing access control for a volume within the computer storage system, comprising:

means for recognizing a failure of the storage controller;
   means for assuming access control of the volume; and
   means for thereafter performing at least one write to the volume,
   wherein, for a predetermined number of writes to the volume after failure of the storage controller, new parity is calculated for the write using other data.

15. The computer storage system as claimed in claim 14, wherein the predetermined number of writes is at least equal to or greater than the queue depth of the storage controller.

16. The computer storage system as claimed in claim 14, further comprising means, upon performing the predetermined number of writes to the volume after failure of the storage controller, for performing an additional write to the volume, wherein new parity is determined via one of calculating new parity using old data and old parity and calculating new parity using other data.

17. The computer storage system as claimed in claim 14, wherein the computer storage system further includes a second storage controller providing access control for a second volume, the second storage controller being capable of assuming access control of the first volume upon recognizing the failure of the first storage controller.

18. The computer storage system as claimed in claim 17, further comprising means for performing at least one write to the second volume after failure of the storage controller, wherein new parity is determined via one of calculating new parity using old data and old parity and calculating new parity using other data.

19. The computer storage system as claimed in claim 14, wherein the means for performing at least one write to the volume comprises means for retrying a write that failed due to failure of the storage controller.

20. A storage controller for a computer storage system, the storage controller being capable of reducing data parity inconsistencies due to failure of a second storage controller providing access control for a volume within the computer storage system, comprising:

means for recognizing a failure of the second storage controller;
   means for assuming access control of the volume; and
   means for thereafter performing at least one write to the volume,
   wherein, for a predetermined number of writes to the volume after failure of the storage controller, new parity is calculated for the write using other data.

21. The storage controller as claimed in claim 20, wherein the predetermined number of writes is at least equal to or greater than the queue depth of the second storage controller.

22. The storage controller as claimed in claim 20, further comprising means, upon performing the predetermined number of writes to the volume after failure of the second storage controller, for performing an additional write to the volume, wherein new parity is determined via one of calculating new parity using old data and old parity and calculating new parity using other data.

23. The storage controller system as claimed in claim 20, wherein the storage controller is suitable for providing access control for a second volume.

24. The storage controller as claimed in claim 23, further comprising means for performing at least one write to the second volume after failure of the second storage controller, wherein new parity is determined via one of calculating new parity using old data and old parity and calculating new parity using other data.

25. The storage controller as claimed in claim 20, wherein the means for performing at least one write to the volume comprises means for retrying a write that failed due to failure of the storage controller.

* * * * *